ly harmful action of a too high temperature very briefly. I also have found that in carrying out such short time treatment with moderate heat, it is not necessary to peel the potatoes, and by this also precious materials in said tubers can be retained.

2,798,815
METHOD OF PREPARING A GRANULAR FOOD PRODUCT FROM POTATOES

Andrew Medriczky, New York, N. Y., assignor to "Potagrain Foods" Refining Corporation, Inc., New York, N. Y.

No Drawing. Application August 4, 1954, Serial No. 447,910

1 Claim. (Cl. 99—207)

My invention relates to novel food products and to novel methods for preparing the same.

More particularly my invention relates to durable pre-cooked products comprising carbohydrates, proteins, vitamins, other nutritious materials and, if so desired, taste-improving savory substances and medical preparations.

The carbohydrates which consist generally of especially processed potato products are supposed to provide a carrier for the other products contained in the novel food products.

The new products according to my invention are of granular texture; they are preferably shaped into hard grains of the size of rice or of somewhat smaller size. They are non-hygroscopic, easily storable, transportable and do not change in taste, consistence of color during long storage.

When treated with a suitable liquid as water, milk, soup, heated below the boiling point, i. e. to about 80° C. for a few minutes only, the pre-cooked grains of the novel food stuff expand into a fluffy material still presenting individual grains and having a structure similar to that of cooked rice. Only one part of the hot liquid applied to one part of my granulated dehydrated food products is necessary for reconstitution of said products, while commercial dehydrated potato products use about four parts of water to one part of product for reconstitution.

The processed potato products which serve as carriers for the other ingredients of my new food products are dehydrated in a manner not known heretofore, as described hereafter.

Known preserved potato products comprise dehydrated mashed potatoes, dehydrated diced potatoes and potato flour. The mashed and diced potatoes tend to brown and to develop offending flavor during storage. They are generally sulfited for storage stability.

The potato products according to the present invention are stable and do not need sulfiting for storage stability.

Up to now, dehydrated potato products have been generally peeled before dehydration. In this case, vitamins are lost by heating and boiling the peeled potatoes. Furthermore, due to the fact that the nutrients are present in greater concentration in the external phloem near to the skin, than deep in the flesh of the potato, valuable components of the fresh potatoes are lost by the peeling of the same. For this reason, some processors of dehydrated potatoes do not peel potatoes before processing the same, but separate the particles of skin by screening the processed dried product in order to increase the yield and to lose less nutrients than by peeling the potato. This is obviously a tedious process.

According to the present invention the potatoes are not peeled before dehydrating and are only submitted to moderate heat treatment for relatively short periods.

These and other features of my invention will become apparent from the following detailed specification of the same.

In carrying out my invention I prepare a carrier consisting of processed potatoes and adapted to preserve besides the contents of the starting material additional carbohydrates and proteins, vitamins, savory substances, medical preparations if so desired, etc. by submitting raw potato tubers to a treatment comprising the following steps:

1. Washing the unpeeled potatoes;
2. Slicing and trimming the same;
3. Treating with wet steam and thereafter treating in dry heat.
4. Cooling down the material to air temperature;
5. Mashing the resulting material by whirling-kneading-mixing and pre-shaping the material of the carrier;
6. Drying the pre-shaped material;
7. Reducing the dried material to the desired shape and size by milling and screening the same.

The different steps of this treatment may be performed as hereafter described.

1. Unpeeled potatoes are thoroughly cleaned by washing, preferably at first by applying a cold water jet and thereafter by rinsing with warm water.

2. The washed potatoes will be cut into pieces of about walnut size. They are then inspected, and if necessary trimmed.

3. The so prepared potatoes are pre-cooked in wet steam, for instance in a double wall steam boiler at a temperature of about 70–75° C. for about 20–25 minutes. Thereafter, they are exposed briefly to a dry heat treatment during which the temperature is increased to about 95° C., whereby the browning phenoloxydases will be inactivated.

4. The so-treated potatoes will be cooled down to air temperature by spreading the same and exposing them to open air for several hours in order to cause the starch grains to settle down and to evaporate part of the surface moisture.

5. Additional material in prefixed proportions can now be mixed to the so-far processed potato carrier by submitting the material to a mixing, kneading and whirling treatment. This treatment will preferably be performed in a device provided with rotary knives and a conveying screw similar to a meat chopper whereby the ingredients of the mass are minced and transformed into a paste. This paste is pressed through holes having a diameter of about 4 mm. provided at the outlet of the chopping device. Said holes are preferably star shaped in order to increase the evaporating surface of the threads of the potato emanating from the mixing device.

6. The so pre-shaped material will be spread out on trays or roller driers and submitted to a treatment in a dehydrator provided with air circulation at temperatures of about 50–55° C. The material may also be dried by exposing the same to open air, under a temperature not lower than 30° C. in order to avoid the growth of mould caused by fungi.

7. The resulting completely dry and rigid material will now be submitted to a crushing process, for instance in a hammer mill whereby the material is reduced to grains of rice size (2–3 mm.), grains of grit size (1 mm.), to powder-like particles, or similar. The particles of different size can be separated by screening, and the powder may be used in order to absorb moisture, in order to enhance the drying processes, if necessary. This can be done in a subsequent procedure.

One important feature of my invention is to be seen in the fact that I avoid any touch with water of the already cleaned, cut, and trimmed potatoes during the preparation of the potato carrier, since I have found that by the action of water valuable ingredients, such as mineral salts, a large amount of proteins, sugar and starch are lost by the usual dehydrating methods operating with water. The temperatures used by me are critical. The temperature in cooking by steam, somewhat below 100° C. is necessary, as mentioned hereinbefore to inactivate the darkening phenoloxydases. This temperature has to be applied, however, for the possible shortest time in order to avoid the loss of, for instance, free amino acids which will be destroyed by exposing the material to longer duration high temperatures.

Another feature of my process is the appliance of temperatures of about 50–55° C. (the gelatinization point of starch), in the drying process, because this secures the so-called pudding effect of the starch which will cause the expansion of my novel products into a fluffy material (similar to the known expansion of minute rice) in the stage of rehydration of the novel foodstuff.

The additional substances to be incorporated in my potato carrier consist of proteins, vitamins, mineral salts, medical preparations, and the like.

Cooked and chopped fatless meat, fish, mushrooms, spinach, soya beans, soya bean flour, peanuts, peanut flour, maize, maize flour, powdered eggs, powdered milk, milk albumen, onions, celery, red pepper, calcium, phosphorous, iodine containing powders, natural or artificial vitamins may be incorporated in the carrier in the stage of whirling-mixing-kneading.

EXAMPLE 1

*Preparation of food products with simultaneous addition of various flours or powders, such as soy bean flour, peanut flour, egg powder, etc.*

The potatoes are taken out of the steam boiler, and while still moist and hot, mixed with the above-named powdery materials in and about of 5% by weight of the moist goods. The powders are poured onto the surface of the potatoes and thoroughly mixed therewith in a kneader and the like, to insure even distribution between the potatoes and the other material. The mass is then allowed to cool and to stand several hours at room temperature. Thereafter, the goods are fed into a processing machine, where they are again thoroughly kneaded, intimately mixed, and cut down to smaller pieces. The pieces are pressed into the shape of strings or the like and conveyed to air-drying grids.

EXAMPLE 2

*Processing with simultaneous use of mushrooms*

The mushrooms used are preferably pre-dried and used in an amount of 2.5% by weight calculated on the moist potatoes. The mushrooms are mixed with the hot, moist potatoes in a mixer, where they are moistened by the steam given off by the potatoes. The mass is allowed to stand in a covered vessel for half an hour and then uncovered for cooling. Thereupon, the entire goods are fed to a processing machine, where they are kneaded, mixed and cut down. They are then pressed into strings. If these are still inhomogeneous, which can be easily noticed by the darker mushrooms showing up in the kneaded mass, the strings are again passed through the processing machine in order to provide even distribution of the mushrooms throughout the mass. The strings are then conveyed to drying grids.

EXAMPLE 3

*Processing with simultaneous addition of onions, celery, or other ingredients having a strong odor*

When using the above-mentioned ingredients, these are added in dry form in the amount of 2.5% by weight calculated on the moist potatoes. The added substances are distributed on the steaming hot potatoes and well mixed in a mixer, and thereafter cooled. The odor of the moistened onions, etc. penetrates into the potatoes. The processing occurs as above described and the strings formed by pressing are conveyed to drying grids.

EXAMPLE 4

*Processing with addition of meat*

As addition of meat, beef is preferably used which was trimmed free of fat and the coarser connecting tissues. The meat is pre-ground through a perforated plate having holes of 1 inch diameter and put in a double-boiler for stewing in its own juice, water being added if necessary. Seasoning can be added to the meat while it is stewing, but addition of salt should be avoided.

After the meat has been boiled until it is well done, it is mixed with about the same amount of the potato product which in this case has been dried. Preferably, the flour obtained as a by-product in the processing of the potatoes is added to the meat, so as to reduce the moisture in the latter. The entire mass is now well kneaded until the potato flour has absorbed the moisture of the meat. To the kneaded mass, an equal amount of the steamed and cooled potato pieces is gradually added and the entire mass is then carefully mixed, so that the individual pieces of the potato will not be mashed. Then, the mixture is fed to a processing machine where it is comminuted by simultaneous whirling-kneading-mixing process. The mass is then pressed into strings and conveyed to drying grids, where it is first dried superficially at a temperature of about 75° C. The temperature may then be decreased to about 50° C. and the drying completed at that temperature. The dried goods are sieved and the smallest grain size, which forms a powder, is separated as a by-product and used later on as addition for further batches of meat.

EXAMPLE 5

This is another example for the use of meat as an addition to the potatoes.

In this case, a double-boiler is filled to about one-third with ground and seasoned meat which is allowed to stew until it is not quite done. The double-boiler is then opened and filled to capacity with potatoes cut to walnut size or smaller size, which have been washed but not otherwise prepared. The mass is lightly mixed and allowed to stew together, until the potatoes are done, by steaming in their own steam as well as the steam of the meat juice. Overcooking should be avoided and the potatoes should retain their original shape.

The entire mass is then taken out, spread out in a cool chamber and allowed to cool down.

In order to remove the moisture more thoroughly, the cooled mass may be mixed with dry potato flour obtained as a by-product in a previous processing operation.

While I have described preferred embodiments of my invention, it is obvious that many changes and modifications can be made in the above described examples without departing from the nature and spirit of the invention and it will be understood that the invention is not to be limited to the details given in said examples except as set forth in the appended claim.

What I claim is:

The process of preparing from potatoes a granular food product which expands into a fluffy material presenting still individual grains when heated with equal parts of a liquid to about 80° C., said process comprising slicing and trimming washed unpeeled potatoes into pieces of about walnut size; pre-cooking said pieces at a temperature of about 70 to 75° C. for about 20 to 25 minutes; exposing said pre-cooked material for a short time to a dry-heat treatment at a temperature increased to about 95° C.; cooling down the resulting material to room temperature; submitting the still moldable material to a mixing, kneading and whirling treatment; pre-shaping the partly dried resulting material in the form of strings; dehydrating said strings at temperatures between 50–55° C. and reducing the resulting dry and rigid material by a crushing process to a grain-like size.

References Cited in the file of this patent

UNITED STATES PATENTS

| | | |
|---|---|---|
| 38,039 | Frost | Mar. 31, 1863 |
| 2,352,670 | Volpertas | July 4, 1944 |
| 2,438,939 | Ozai-Durrani | Apr. 6, 1948 |
| 2,490,431 | Greene et al. | Dec. 6, 1949 |
| 2,572,762 | Rivoche | Oct. 23, 1951 |